United States Patent
Murata

(10) Patent No.: US 7,200,319 B2
(45) Date of Patent: Apr. 3, 2007

(54) RECORDING-MEDIUM REPRODUCTION METHOD AND RECORDING-MEDIUM REPRODUCTION APPARATUS

(75) Inventor: Mitsuhiro Murata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1471 days.

(21) Appl. No.: 10/003,661

(22) Filed: Oct. 31, 2001

(65) Prior Publication Data

US 2002/0057904 A1    May 16, 2002

(30) Foreign Application Priority Data

Nov. 14, 2000   (JP) ............................ 2000-346061

(51) Int. Cl.
*H04N 9/88* (2006.01)

(52) U.S. Cl. ............................ 386/2; 386/47; 386/21; 386/113

(58) Field of Classification Search ................ 386/2, 386/47, 21, 113, 124
See application file for complete search history.

(56) References Cited

U.S. PATENT DOCUMENTS 5,367,341 A * 11/1994 Schnorf ........................ 386/55
5,784,527 A *  7/1998 Ort ............................. 386/111
6,223,322 B1    4/2001 Michigami et al.

FOREIGN PATENT DOCUMENTS

EP    0 847 195    6/1998
JP    10126743     5/1998

\* cited by examiner

*Primary Examiner*—James J. Groody
*Assistant Examiner*—James A. Fletcher
(74) *Attorney, Agent, or Firm*—Brinks Hofer Gilson & Lione

(57) ABSTRACT

When it is impossible to read NV_PCK from a DVD, a frame-start-position-information reading section reads VOBU_SRI obtained immediately before reading became impossible, stored in a memory; a search control section starts searching for the ddress indicated by FWDIn described in VOBU_SRI; when the address searched for can be read, reproduction is restarted from the corresponding VOBU; and if the address searched for cannot be read, the search control section starts searching for the address indicated by the next FWDIn to detect a VOBU of which the address can be read, and reproduction is restarted.

15 Claims, 15 Drawing Sheets

FIG. 4

| NAME | CONTENT | NO. OF BYTES |
|---|---|---|
| FWDI Video | START ADDRESS OF NEXT VOBU HAVING VIDEO DATA | 4 BYTES |
| FWDI 240 | START ADDRESS OF +240 VOBU AND VIDEO STORAGE FLAG | 4 BYTES |
| FWDI 120 | START ADDRESS OF +120 VOBU AND VIDEO STORAGE FLAG | 4 BYTES |
| FWDI 60 | START ADDRESS OF +60 VOBU AND VIDEO STORAGE FLAG | 4 BYTES |
| FWDI 20 | START ADDRESS OF +20 VOBU AND VIDEO STORAGE FLAG | 4 BYTES |
| FWDI 15 | START ADDRESS OF +15 VOBU AND VIDEO STORAGE FLAG | 4 BYTES |
| FWDI 14 | START ADDRESS OF +14 VOBU AND VIDEO STORAGE FLAG | 4 BYTES |
| FWDI 13 | START ADDRESS OF +13 VOBU AND VIDEO STORAGE FLAG | 4 BYTES |
| FWDI 12 | START ADDRESS OF +12 VOBU AND VIDEO STORAGE FLAG | 4 BYTES |
| FWDI 11 | START ADDRESS OF +11 VOBU AND VIDEO STORAGE FLAG | 4 BYTES |
| FWDI 10 | START ADDRESS OF +10 VOBU AND VIDEO STORAGE FLAG | 4 BYTES |
| FWDI 9 | START ADDRESS OF +9 VOBU AND VIDEO STORAGE FLAG | 4 BYTES |
| FWDI 8 | START ADDRESS OF +8 VOBU AND VIDEO STORAGE FLAG | 4 BYTES |
| FWDI 7 | START ADDRESS OF +7 VOBU AND VIDEO STORAGE FLAG | 4 BYTES |
| FWDI 6 | START ADDRESS OF +6 VOBU AND VIDEO STORAGE FLAG | 4 BYTES |
| FWDI 5 | START ADDRESS OF +5 VOBU AND VIDEO STORAGE FLAG | 4 BYTES |
| FWDI 4 | START ADDRESS OF +4 VOBU AND VIDEO STORAGE FLAG | 4 BYTES |
| FWDI 3 | START ADDRESS OF +3 VOBU AND VIDEO STORAGE FLAG | 4 BYTES |
| FWDI 2 | START ADDRESS OF +2 VOBU AND VIDEO STORAGE FLAG | 4 BYTES |
| FWDI 1 | START ADDRESS OF +1 VOBU AND VIDEO STORAGE FLAG | 4 BYTES |
| FWDI Next | START ADDRESS OF NEXT VOBU AND VIDEO STORAGE FLAG | 4 BYTES |
| BWDI Prev | START ADDRESS OF PRECEDING VOBU AND VIDEO STORAGE FLAG | 4 BYTES |
| BWDI 1 | START ADDRESS OF -1 VOBU AND VIDEO STORAGE FLAG | 4 BYTES |
| BWDI 2 | START ADDRESS OF -2 VOBU AND VIDEO STORAGE FLAG | 4 BYTES |
| BWDI 3 | START ADDRESS OF -3 VOBU AND VIDEO STORAGE FLAG | 4 BYTES |
| BWDI 4 | START ADDRESS OF -4 VOBU AND VIDEO STORAGE FLAG | 4 BYTES |
| BWDI 5 | START ADDRESS OF -5 VOBU AND VIDEO STORAGE FLAG | 4 BYTES |
| BWDI 6 | START ADDRESS OF -6 VOBU AND VIDEO STORAGE FLAG | 4 BYTES |
| BWDI 7 | START ADDRESS OF -7 VOBU AND VIDEO STORAGE FLAG | 4 BYTES |
| BWDI 8 | START ADDRESS OF -8 VOBU AND VIDEO STORAGE FLAG | 4 BYTES |
| BWDI 9 | START ADDRESS OF -9 VOBU AND VIDEO STORAGE FLAG | 4 BYTES |
| BWDI 10 | START ADDRESS OF -10 VOBU AND VIDEO STORAGE FLAG | 4 BYTES |
| BWDI 11 | START ADDRESS OF -11 VOBU AND VIDEO STORAGE FLAG | 4 BYTES |
| BWDI 12 | START ADDRESS OF -12 VOBU AND VIDEO STORAGE FLAG | 4 BYTES |
| BWDI 13 | START ADDRESS OF -13 VOBU AND VIDEO STORAGE FLAG | 4 BYTES |
| BWDI 14 | START ADDRESS OF -14 VOBU AND VIDEO STORAGE FLAG | 4 BYTES |
| BWDI 15 | START ADDRESS OF -15 VOBU AND VIDEO STORAGE FLAG | 4 BYTES |
| BWDI 20 | START ADDRESS OF -20 VOBU AND VIDEO STORAGE FLAG | 4 BYTES |
| BWDI 60 | START ADDRESS OF -60 VOBU AND VIDEO STORAGE FLAG | 4 BYTES |
| BWDI 120 | START ADDRESS OF -120 VOBU AND VIDEO STORAGE FLAG | 4 BYTES |
| BWDI 240 | START ADDRESS OF -240 VOBU AND VIDEO STORAGE FLAG | 4 BYTES |
| BWDI Video | START ADDRESS OF PRECEDING VOBU HAVING VIDEO DATA | 4 BYTES |

FIG. 7

| PGC_GI | PGC_CMDT | PGC_PGMAP | C_PBIT | C_POSIT |

| PGC_CNT | PGC_PB_TM | PGC_UOP_CTL | PGC_AST_CTLT | PGC_SPST_CTLT | PGC_SP_PLT | PGC_NV_CTL | PGC_SP_PLT | PGC_CMDT_SA | PGC_PGMAP_SA | C_PBIT_SA | C_POSIT_SA |

| reserved | Number of Programs | Number of Cells |

DPL

RECORDING-MEDIUM REPRODUCTION METHOD AND RECORDING-MEDIUM REPRODUCTION APPARATUS

BACKGROUND OF THE INVENTION

1. Field of the Invention

The present invention relates to recording-medium reproduction methods and recording-medium reproduction apparatuses, and more specifically, to a recording-medium reproduction method and a recording-medium reproduction apparatus which restart reproduction from a portion where reading can be performed if reading becomes impossible during reproduction.

2. Description of the Related Art

Recording-medium reproduction apparatuses read a reproduction order specified in reproduction data stored in a loaded recording medium and perform reproduction according to the read reproduction order. The recording-medium reproduction apparatuses also allow the user to specify a stop operation, a fast-forward operation, and a fast-rewinding operation.

In conventional recording-medium reproduction apparatuses, for example, in DVD video reproduction apparatuses, a reproduction order specified in reproduction data stored in an optical disk serving as a recording medium is read and reproduction is performed. Therefore, if dirt adheres to or a scratch is made on the optical disk, since the reproduction order cannot be read, reproduction is stopped. To restart reproduction, the user needs to substantially fast forward through the reproduction data and to start reproduction at a point where the reproduction order can be read. This is inconvenient.

SUMMARY OF THE INVENTION

Accordingly, an object of the present invention is to provide a recording-medium reproduction method and a recording-medium reproduction apparatus which do not stop reproduction even if it becomes impossible to read a reproduction order, which automatically fast-forward to a point where a reproduction order specified in reproduction data can be read, and which restart reproduction.

The foregoing object is achieved in one aspect of the present invention through the provision of a recording-medium reproduction method for reading, by a pickup, reproduction data stored in a recording medium in units of frames and for reproducing it, including the steps of reading the start-position information of the next frame and that of a predetermined frame other than the next frame; storing the read start-position information of the frames; controlling the pickup according to the read start-position information of the next frame; reading the next frame; if the next frame can be read, reproducing the reproduction data of the next frame; and if the next frame cannot be read, reading a frame other than the next frame according to the stored start-position information of the predetermined frame and reproducing the reproduction data of a frame which can be read. Therefore, a fast-forward operation can be automatically achieved until a reproduction order is read in reproduction data.

The foregoing object is achieved in another aspect of the present invention through the provision of a recording-medium reproduction method for reading, by a pickup, reproduction data stored in a recording medium in units of frames and for reproducing it, including the steps of reading the start-position information of the next frame and that of a plurality of types of predetermined frames other than the next frame; storing the read start-position information of the next frame and that of the plurality of types of predetermined frames other than the next frame; controlling the pickup according to the read start-position information of the next frame; reading the next frame; if the next frame can be read, reproducing the reproduction data of the next frame; and if the next frame cannot be read, reading a frame other than the next frame according to the stored start-position information of the plurality of types of predetermined frames and reproducing the reproduction data of a frame which can be read. Therefore, a fast-forward operation can be automatically achieved until a reproduction order is read in reproduction data.

The foregoing object is achieved in still another aspect of the present invention through the provision of a recording-medium reproduction apparatus for reading, by a pickup, reproduction data stored in a recording medium in units of frames and for reproducing it, including frame-start-position-information reading means for reading the start-position information of the next frame and that of a predetermined frame other than the next frame; a memory for storing the information read by the frame-start-position-information reading means; and reproduction control means for controlling the pickup according to the start-position information of the next frame, read by the frame-start-position-information reading means, for reading the next frame, for reproducing the reproduction data of the next frame if the next frame can be read, and for reading a frame other than the next frame according to the start-position information of the predetermined frame stored in the memory and reproducing the reproduction data of a frame which can be read if the next frame cannot be read. Therefore, even if reading a reproduction order becomes impossible and reproduction is stopped, a fast-forward operation is automatically achieved until a reproduction order is read in reproduction data, and reproduction is restarted in the recording-medium reproduction apparatus.

The foregoing object is achieved in yet another aspect of the present invention through the provision of a recording-medium reproduction apparatus for reading, by a pickup, reproduction data stored in a recording medium in units of frames and for reproducing it, including frame-start-position-information reading means for reading the start-position information of the next frame and that of a plurality of types of predetermined frames other than the next frame; a memory for storing the information read by the frame-start-position-information reading means; and reproduction control means for controlling the pickup according to the start-position information of the next frame, read by the frame-start-position-information reading means, for reading the next frame, for reproducing the reproduction data of the next frame if the next frame can be read, and for reading a frame other than the next frame according to the start-position information of the plurality of types of predetermined frames stored in the memory and reproducing the reproduction data of a frame which can be read if the next frame cannot be read. Therefore, even if reading a reproduction order becomes impossible and reproduction is stopped, a fast-forward operation is automatically achieved until a reproduction order is read in reproduction data, and reproduction is restarted in the recording-medium reproduction apparatus.

The foregoing object is achieved in a further aspect of the present invention through the provision of a recording-medium reproduction apparatus for reading, by a pickup, reproduction data stored in a recording medium in units of frames and for reproducing it, including a frame-startposition-information reading section for reading the start-position information of the next frame and that of a predetermined frame other than the next frame; a memory for storing the information read by the frame-start-position-information reading section; and a reproduction control section for controlling the pickup according to the start-position information of the next frame, read by the frame-start-position-information reading section, for reading the next frame, for reproducing the reproduction data of the next frame if the next frame can be read, and for reading a frame other than the next frame according to the start-position information of the predetermined frame stored in the memory and reproducing the reproduction data of a frame which can be read if the next frame cannot be read. Therefore, even if reading a reproduction order becomes impossible and reproduction is stopped, a fast-forward operation is automatically achieved until a reproduction order is read in reproduction data, and reproduction is restarted in the recording-medium reproduction apparatus.

The foregoing object is achieved in a still further aspect of the present invention through the provision of a recording-medium reproduction apparatus for reading, by a pickup, reproduction data stored in a recording medium in units of frames and for reproducing it, including a frame-start-position-information reading section for reading the start-position information of the next frame and that of a plurality of types of predetermined frames other than the next frame; a memory for storing the information read by the frame-start-position-information reading section; and a reproduction control section for controlling the pickup according to the start-position information of the next frame, read by the frame-start-position-information reading section, for reading the next frame, for reproducing the reproduction data of the next frame if the next frame can be read, and for reading a frame other than the next frame according to the start-position information of the plurality of types of predetermined frames, stored in the memory and reproducing the reproduction data of a frame which can be read if the next frame cannot be read.

BRIEF DESCRIPTION OF THE DRAWINGS

FIG. 4 illustrates the data structure of VOBU_SRI.

FIG. 7 illustrates the data structure of PGC_GI.

DESCRIPTION OF THE PREFERRED EMBODIMENTS (A) First Embodiment of the Present Invention (a) Structure of a Recording-medium Reproduction Apparatus According to a First Embodiment of the Present Invention FIG. 1 is a block diagram of a recording-medium reproduction apparatus according to a first embodiment of the present invention. In this embodiment, a DVD reproduction apparatus serves as a recording-medium reproduction apparatus. There are shown in the figure a DVD 101 serving as a recording medium, a spindle motor 102 for rotating the DVD 101, a pickup 103 for emitting laser light having a predetermined wavelength to the DVD 101 and for converting reflected light into an electric signal, a head amplifier 104 for applying amplification, waveform shaping, and digital processing to the electric signal sent from the pickup 103, and a demodulation/error-correcting section 105 for applying demodulation and error-correcting to a signal provided from the head amplifier 104.

Figure 1:
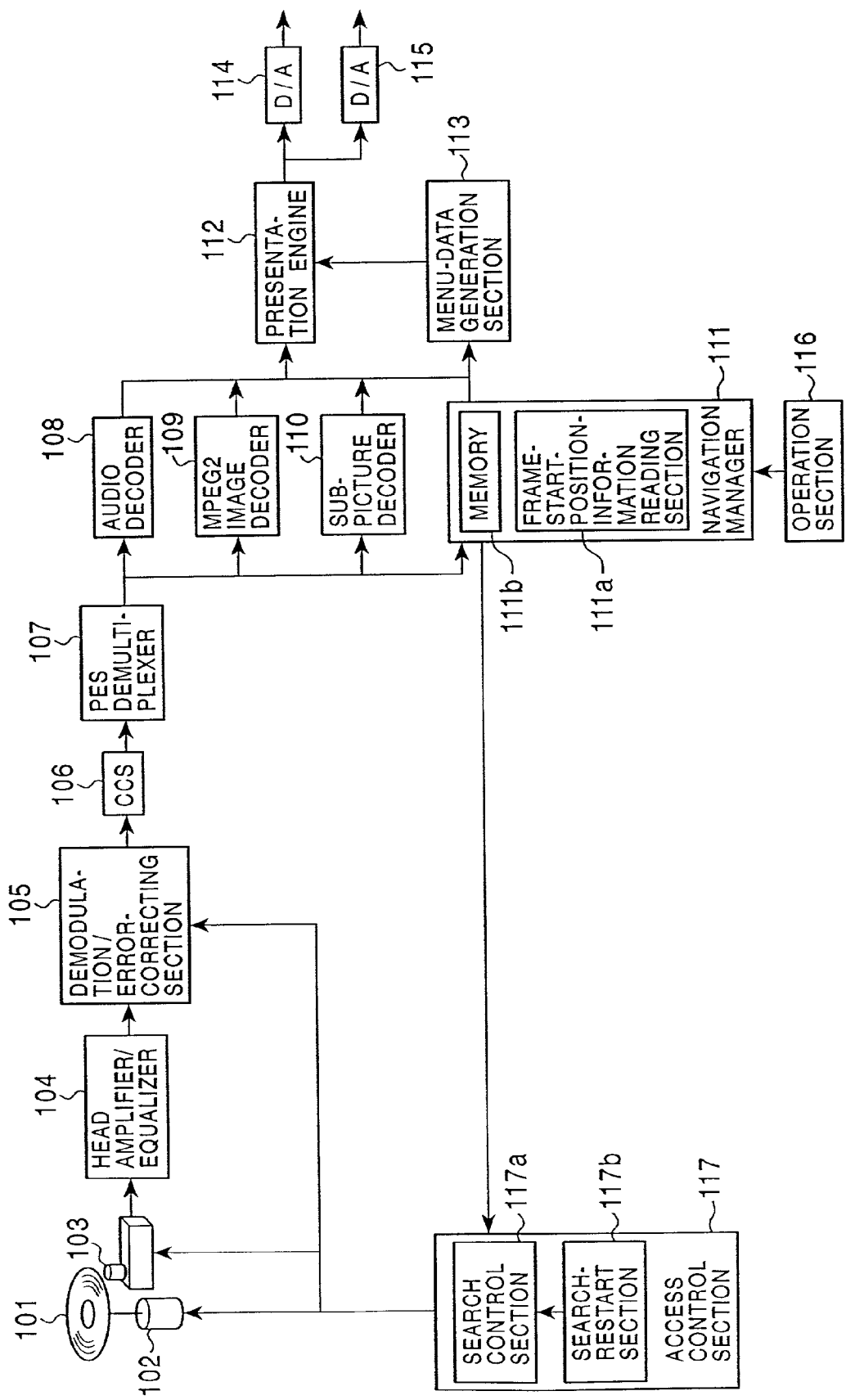
FIG. 1 is a block diagram of a recording-medium reproduction apparatus according to a first embodiment of the present invention.

A CCS processing section 106 performs mutual authentication between the DVD 101 and the DVD reproduction apparatus. A demultiplexer 107 separates a signal read from the DVD 101 into audio, video, sub-picture, and navigation-data packetized elementary streams (PESs).

An audio decoder 108 applies audio decoding conforming to an audio compressed-encoding method, such as MPEG, AAC, or AC3, to the audio PES separated by the demultiplexer 107. An MPEG2 image decoder 109 decodes the video PES separated by the demultiplexer 107. A sub-picture decoder 110 decodes the sub-picture PES separated by the demultiplexer 107. A navigation manager 111 reads the navigation data separated by the demultiplexer 107 and performs reproduction control of the DVD 101. The navigation manager 111 includes a frame-start-position-information reading section 111a for reading the reading order of data from the DVD 101 and a memory 111b for storing information read by the frame-start-position-information reading section 111a.

A presentation engine 112 synchronizes an audio signal decoded by the audio decoder 108, a video signal decoded by the MPEG2 image decoder 109, and a sub-picture signal decoded by the sub-picture decoder 110, applies superposition processing to the video signal and the sub-picture signal, performs encoding conforming to a television method, such as NTSC or PAL, and outputs a PCM video signal and a PCM audio signal.

A menu-data generation section 113 generates a menu screen and audio guidance for guiding the user on the operations of the DVD reproduction apparatus, and inputs them to the presentation engine 112. A D/A converter 114 converts the PCM audio signal to an analog audio signal and provides it to the outside. A D/A converter 115 converts the PCM video signal to an analog signal and provides it to the outside.

An operation section 116 includes a remote controller and an operation panel (not shown), and provides an operation instruction of the user to the navigation manager 111. An access control section 117 selects a DVD to be reproduced, selects a multi-story, and controls special reproduction operations such as a fast-forward operation, a rewinding operation, and a halt operation, under the control of the navigation manager 111.

The access control section 117 includes a search control section 117a for applying a search to the DVD 101 when the navigation manager 111 provides an instruction for reading frame-start-position information, and a search-restart section 117b for providing a search-restart instruction for a predetermined frame to the search control section 117a when the frame-start-position-information reading section 111a of the navigation manager 111 provides a signal indicating that the start position of the next frame cannot be read, such as that indicating the pickup 103 cannot be locked, or the type of read data does not match what is expected.

(b) Data Structure of DVD

Figure 2:
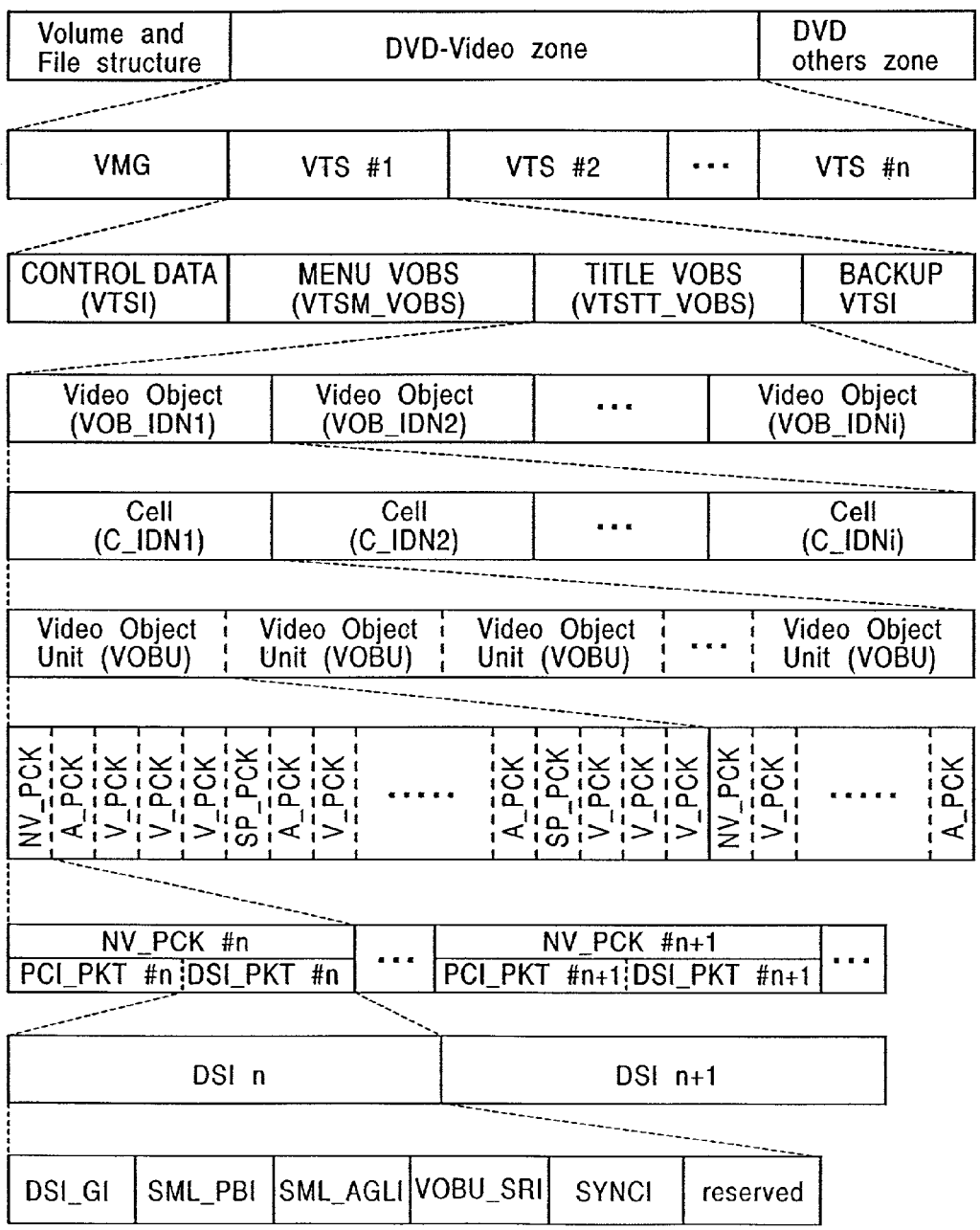
FIG. 2 illustrates a data structure in a DVD 101.

FIG. 2 illustrates a data structure in the DVD 101. The volume space of the DVD is formed of a Volume and File structure, a DVD-Video zone, and a DVD others zone. The DVD-Video zone includes a video manager (VMG) which is a content table of all video title sets, and video title sets (VTSs) which are sets of titles. The VMG is formed of control data called video manager information, a video object set for a VMG menu, and a backup of the control data.

A VTS is formed of control data called VTSI, a video object set for a VTSM (VTSM_VOBS), a video object set for titles in the VTS (VTSTT_VOBS), and a backup VTSI. The VTSTT_VOBS is a set of video objects (VOBs). A VOB is an MPEG program stream formed of a plurality of elementary streams. One VOB is divided into cell groups each formed of a plurality of video object units (VOBUs).

A VOBU is a pack string arranged in the order of recording. It always starts with one navigation pack (NV_PCK); includes a set of packs, such as an audio pack (A_PCK), a video pack (V_PCK), and a sub-picture pack (SP_PCK); ends immediately before the next NV_PCK disposed in the same VOB or at the end of the VOB.

One VOBU has a reproduction period of at least 0.4 seconds to the maximum value of 1 second, except the last VOBU in a cell. The last VOBU in a cell has a reproduction period of at least 0.4 seconds to the maximum value of 1.2 seconds.

NV_PCK includes a presentation control information packet (PCI_PKT) and a data search information packet (DSI_PKT), and is always disposed at the top of a VOBU.

DSI is navigation data for executing VOBU seamless reproduction. DSI is formed of five types of information: DSI general information (DSI_GI), seamless-reproduction information (SML_PBI), seamless angle information (SML_AGLI), VOBU search information (VOBU_SRI), and synchronization information (SYNCI).

(c) VOBU_SRI

Figure 3:
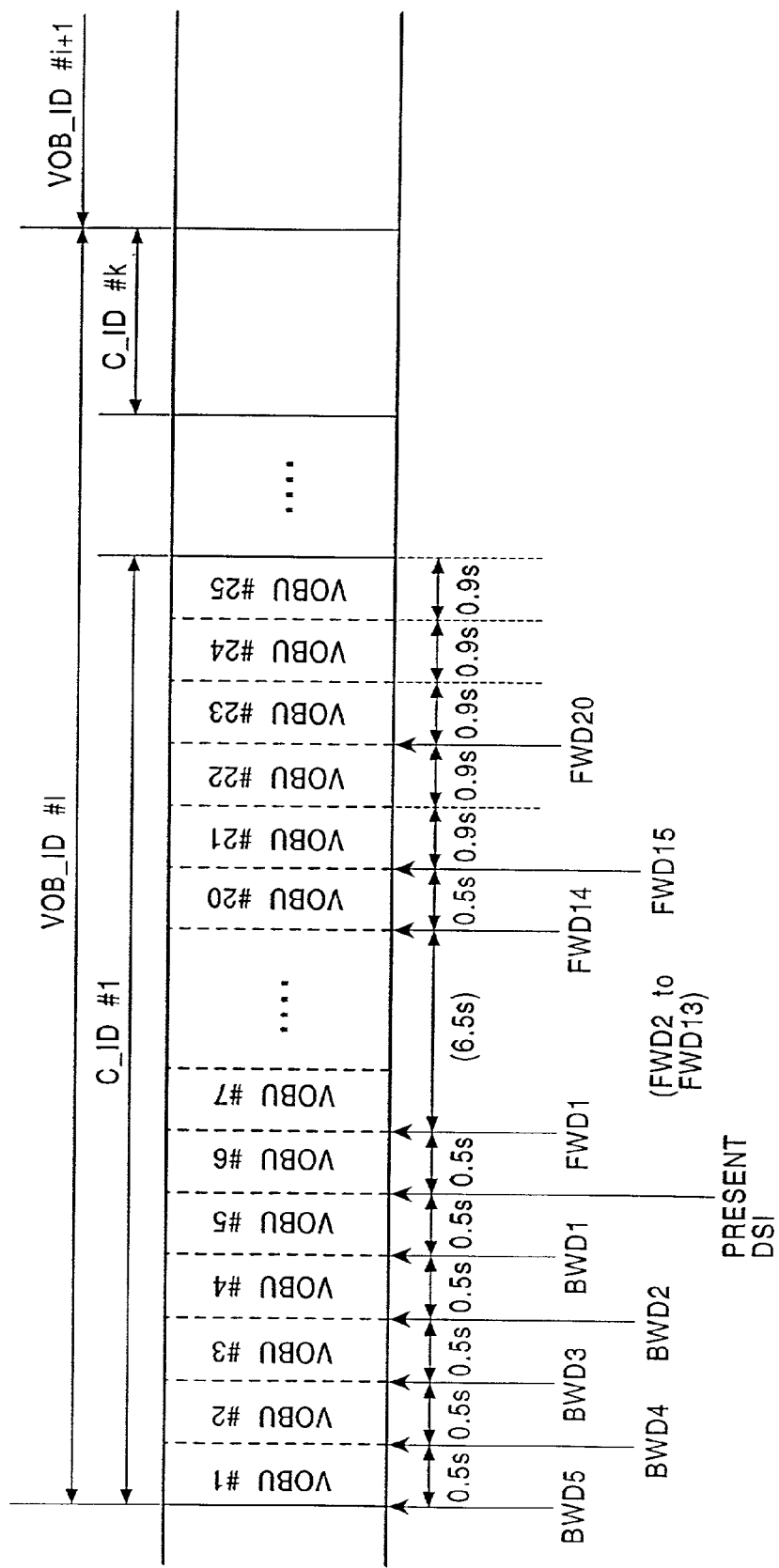
FIG. 3 illustrates the data structure of VOBU_SRI.

VOBU_SRI describes the start addresses of VOBUs to be reproduced 0.5×n seconds before and after the reproduction start time of the VOBU which includes the present DSI in the cell, as shown in FIG. 3 and FIG. 4.

FWDI Video describes the start address of the VOBU nearest in time among VOBUs having video streams in the following VOBUs.

FWDIn describes the start address of the VOBU to be reproduced 0.5×n seconds after the reproduction start time of the present VOBU which includes the present DSI, and a flag indicating whether the VOBU having that address or VOBUs disposed between the present VOBU and the VOBU having that address have video data.

FWDI Next describes the start address of the next VOBU, and a flag indicating whether the next VOBU has video data.

BWDI Prev describes the start address of the VOBU disposed immediately before, and a flag indicating whether the VOBU has video data.

BWDIn describes the start address of the VOBU to be reproduced 0.5×n seconds before the reproduction start time of the present VOBU which includes the present DSI, and a flag indicating whether the VOBU having that address or VOBUs disposed between the present VOBU and the VOBU having that address have video data.

BWDI Video describes the start address of the first VOBU having a video stream in VOBUs disposed before.

(d) Operation Flowchart for the First Embodiment of the Present Invention

Figure 5:
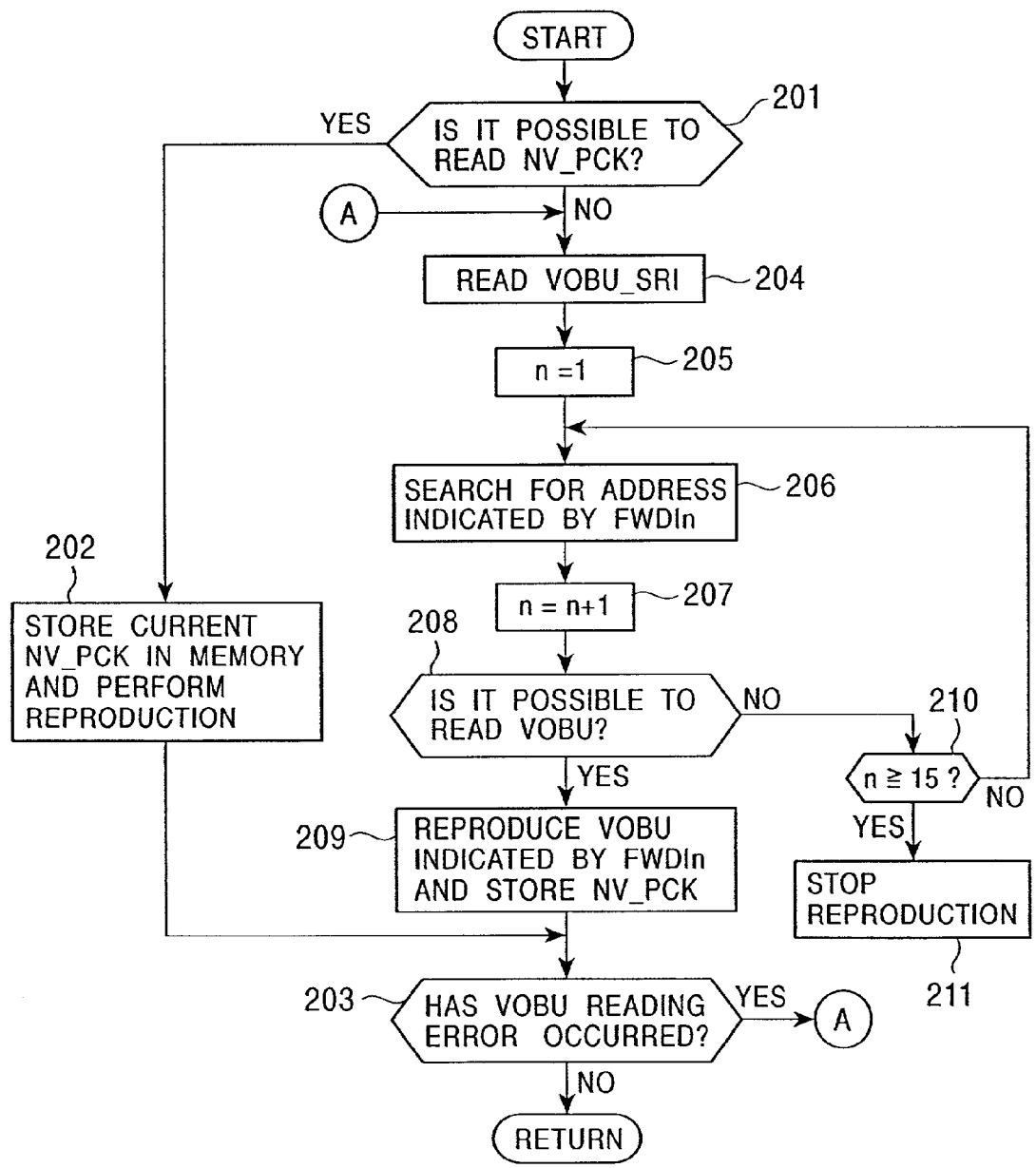
FIG. 5 is a flowchart of operations in the first embodiment of the present invention.

FIG. 5 is a flowchart of operations in the first embodiment of the present invention. The frame-start-position-information reading section 111a determines whether it is possible to read NV_PCK from the DVD 101, by checking, for example, whether the pickup 103 cannot be locked, or whether the type of read data is correct (in step 201). When reading NV_PCK is possible, the current information of NV_PCK is stored in the memory 111b, and reproduction is continued according to a reproduction order included in the stored NV_PCK information (in step 202). Then, the frame-start-position-information reading section 111a determines whether a VOBU reading error has occurred during reproduction, by checking, for example, whether the pickup 103 cannot be locked, or whether the type of read data is correct (in step 203). When no error has occurred, the next VOBU is to be reproduced and the process of step 201 is performed. When reading NV_PCK is impossible in step 201, VOBU_SRI obtained immediately before reading became impossible, stored in the memory 111b, is read (in step 204). The navigation manager 111 sets "n" to 1 in the memory 111b (in step 205).

Then, the search control section 117a searches for the address indicated by the FWDIn (in step 206). The navigation manager 111 increments "n" by 1 in the memory 111b (in step 207). The frame-start-position-information reading section 111a determines whether the VOBU searched for can be read (in step 208).

When VOBU_SRI can be read, the navigation manager 111 instructs the search restart section 117b to search for the VOBU indicated by FWDIn in the VOBU_SRI searched for in step 206, stores NV_PCK in the memory 111b, and restarts reproduction (in step 209).

Back to step 208, when VOBU_SRI cannot be read, the navigation manager 111 determines whether "n" in the memory 111b is equal to or larger than, for example, 15 (in step 210). When "n" is smaller than 15, the processing returns to step 206 and the following processes are executed. When "n" is equal to or larger than 15, the frame-start-position-information reading section 111b instructs the search control section 117a to stop searching to stop reproduction (in step 211).

(B) Second Embodiment of the Present Invention (a) Structure of a Recording-medium Reproduction Apparatus According to a Second Embodiment of the Present Invention.

The structure of a recording-medium reproduction apparatus according to a second embodiment of the present invention is the same as that shown in FIG. 1.

(b) C_POSI

In the second embodiment of the present invention, data indicating the reproduction order of cells, stored in the DVD 101, is used. The data indicating the reproduction order of cells will be described below.

Figure 6:
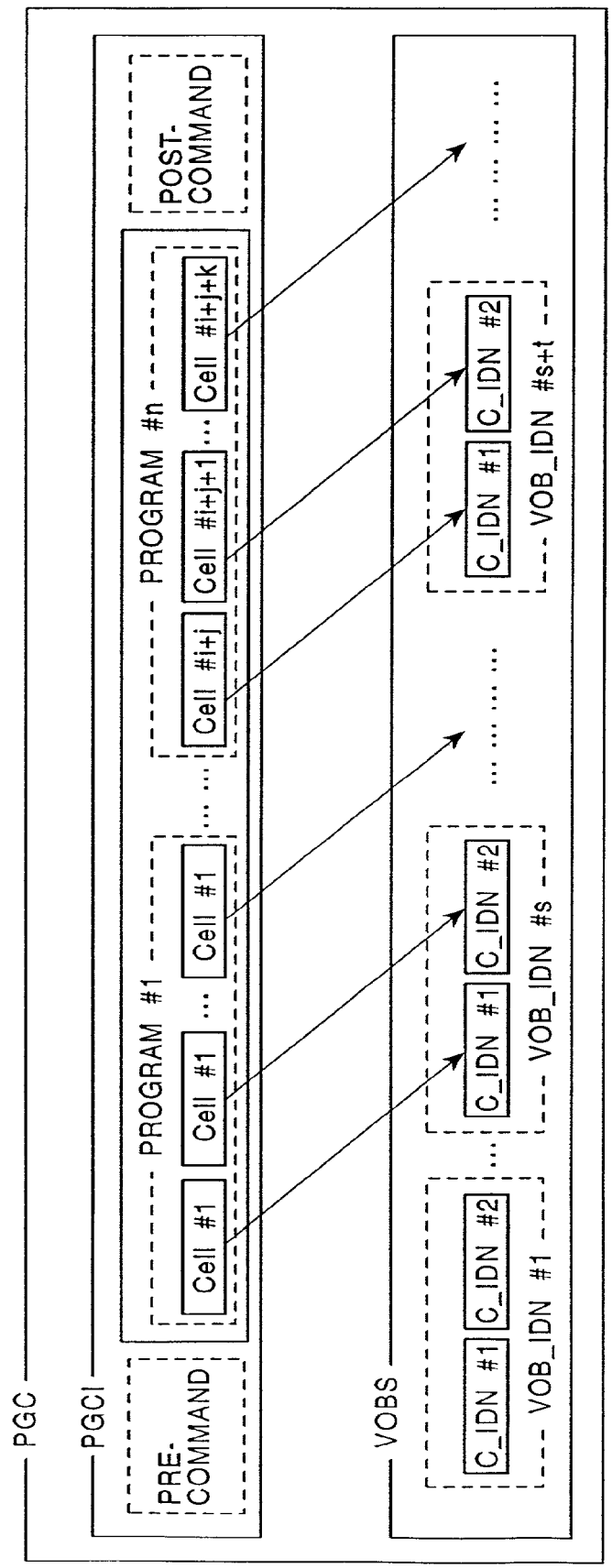
FIG. 6 is a diagrammatic illustration of PGC.

C_POSI is information in a program chain (PGC) included in the DVD 101. As shown in FIG. 6, the PGC is formed of program-chain information (PGCI) and a plurality of video objects (VOBs).

The PGCI is formed of the area of a pre-command which is executed before the PGC is reproduced by the recording-medium reproduction apparatus, such as a DVD video reproduction apparatus; the area of a post-command which is executed after the PGC is reproduced; and a reproduction control block.

The reproduction control block includes the start address of each cell and a cell-reproduction-information table which specifies the order of cells. A program is a set of cells defined in the PGCI. A program is used for dividing the PGC.

FIG. 7 illustrates a data structure in the PGCI. The PGCI is formed of general program-chain information (PGC_GI) which is information related to the PGC; a program-chain-command table (PGC_CMDT) which is a description area for the pre-command, the post-command, and cell commands in the PGC; a program-chain-program map (PGC_PGMAP) which is a map indicating the structures of programs in the PGC; a cell-reproduction-information table (C_PBIT) which is a table defining the reproduction order of cells in the PGC; and a cell-position-information table (C_POSIT) which describes the VOB ID numbers and the cell ID numbers of the cells used in the PGC.

PGC_CNT is formed of Number of Programs which indicates the number of programs in the PGC by a numeral from 0 to 99, Number of Cells which indicates the number of cells in the PGC by a numeral from 0 to 255, and a reserved area for future function extension.

PGC_PB_TM describes the total reproduction time of the programs in the PGC. PGC_UOP_CTL describes a user operation not allowed during PGC reproduction. PGC_AST_CTLT describes a PGC audio stream control table.

PGC_SPST_CTLT describes a PGC sub-picture stream control table. PGC_NV_CTL describes PGC navigation control. PGC_SP_PLT is a PGC sub-picture pallet. PGC_CMDT_SA describes the start address of PGC_CMDT.

PGC_PGMAP_SA describes the start address of PGC_PGMAP, C_PBIT_SA describes the start address of C_PBIT, and C_POSIT_SA describes the start address of C_POSIT.

Figure 8:
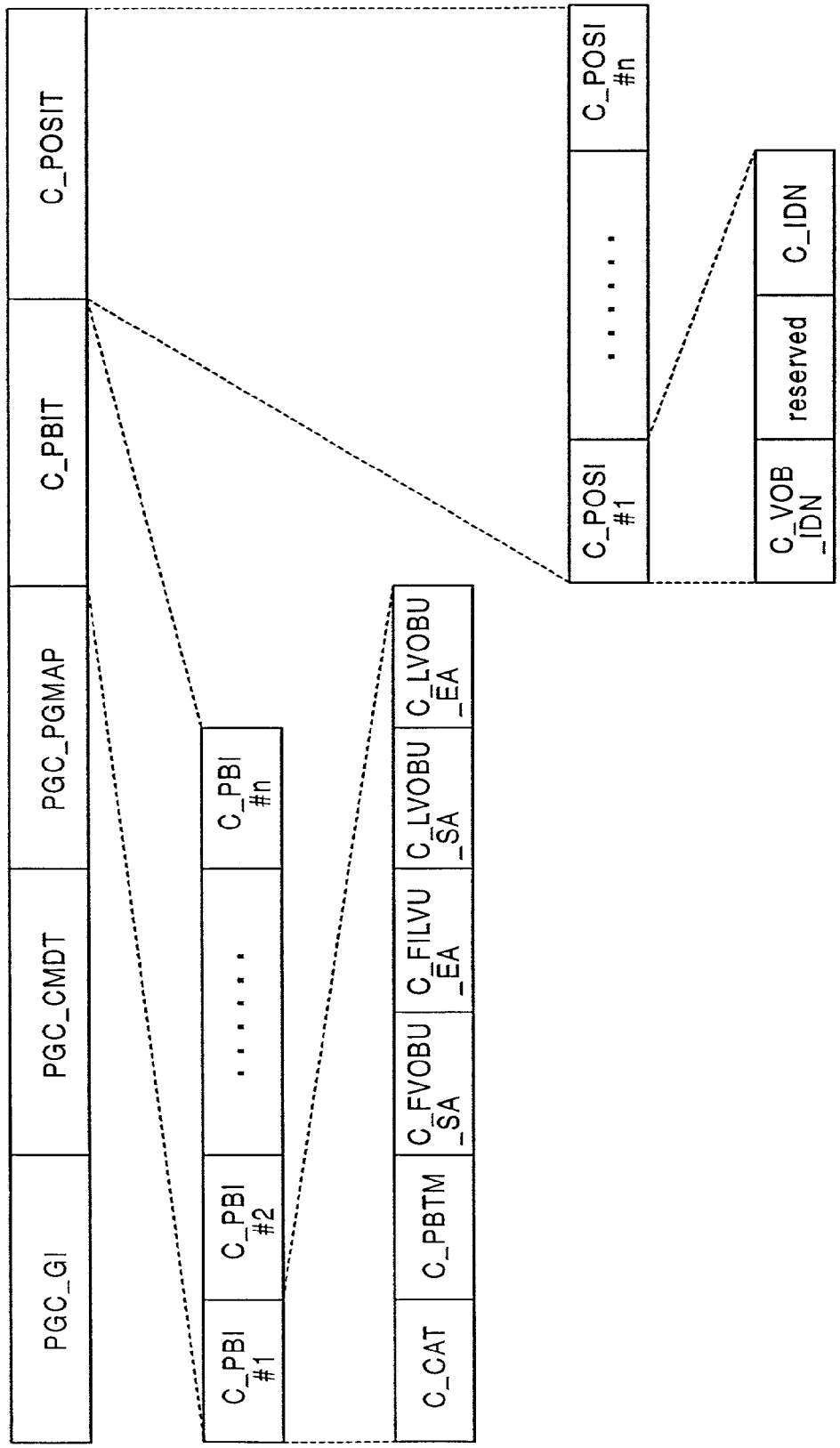
FIG. 8 illustrates the data structure of C_PBIT.

The cell-reproduction-information table (C_PBIT), which is the table defining the reproduction order of cells in the PGC, will be described next. As shown in FIG. 8, C_PBIT describes cell reproduction information (C_PBI) successively, and cell numbers are assigned in the order in which C_PBI is described.

C_PBI is formed of C_CAT indicating the category of the cell; C_PBTM indicating a cell reproduction time; C_FVOBU_SA indicating the start address of the top VOBU of the cell; C_FILVU_EA indicting the end address of the top ILVU of the cell; C_LVOBU_SA indicating the start address of the last VOBU of the cell; and C_LVOBU_SA indicating the end address of the last VOBU of the cell.

The cell-position-information table (C_POSIT), which describes the VOB ID numbers and the cell ID numbers of the cells used in the PGC, will be described next. As shown in FIG. 8, C_POSIT describes the cell position information (C_POSI) corresponding to the cell numbers defined in C_PBIT in the same order as C_PBI.

C_POSI is formed of C_VOB_IDN indicating the VOB ID number of the VOB which includes the cell; a reserved area for future function extension; and C_IDN describing the ID number of the cell.

(c) Operation Flowchart in the Second Embodiment of the Present Invention

Figure 9:
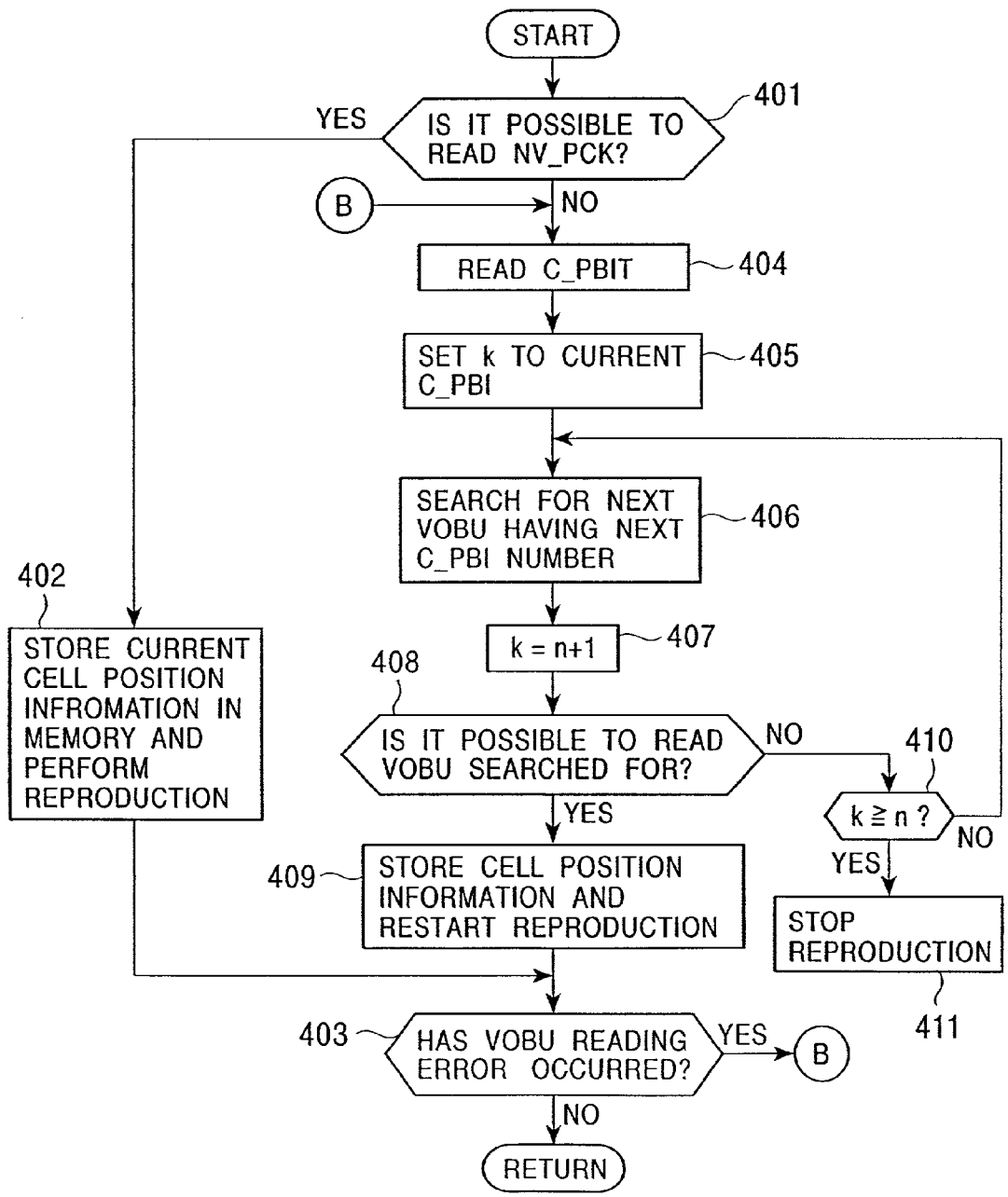
FIG. 9 is a flowchart of operations in a second embodiment of the present invention.

FIG. 9 is a flowchart of operations in the second embodiment of the present invention. The frame-start-position-information reading section 111a determines whether it is possible to read NV_PCK from the DVD 101, by checking, for example, whether the pickup 103 cannot be locked, or whether the type of read data is correct (in step 401). When reading NV_PCK is possible, the current cell-position information is stored in the memory 111b, and reproduction is continued according to a reproduction order included in the stored cell-position information (in step 402). Then, the frame-start-position-information reading section 111a determines whether a VOBU reading error has occurred during reproduction, by checking, for example, whether the pickup 103 cannot be locked, or whether the type of read data is correct (in step 403). When no error has occurred, the next VOBU is to be reproduced and the process of step 401 is performed. When reading NV_PCK is impossible in step 401, the C_PBIT of the cell stored in the memory 111b is read (in step 404). The navigation manager 111 sets "k" to the current C_PBI in the memory 111b (in step 405).

Then, the search control section 117a searches for the VOBU having the next C_PBI number indicated by C_PBIT (in step 406). The navigation manager 111 increments "k" by 1 in the memory 111b (in step 407). The frame-start-position-information reading section 111a determines whether the VOBU searched for in step 406 can be read (in step 408).

When the cell can be read, the navigation manager 111 instructs the search restart section 117b to search for the VOBU searched for in step 406, stores the cell-position information in the memory 111b, and restarts reproduction (in step 409).

Back to step 408, when the VOBU searched for cannot be read, the navigation manager 111 determines whether "k" in the memory 111b is equal to or larger than the number (n) of cells described in Number of Cells (in step 410). When "k" is smaller than "n," the processing returns to step 406 and the following processes are executed. When "k" is equal to or larger than "n," the frame-start-position-information reading section 111b instructs the search control section 117a to stop searching to stop reproduction (in step 411).

(C) Third Embodiment of the Present Invention (a) Structure of a Recording-medium Reproduction Apparatus According to a Third Embodiment of the Present Invention.

The structure of a recording-medium reproduction apparatus according to a third embodiment of the present invention is the same as that shown in FIG. 1.

(b) PGC_PGMAP

In the third embodiment of the present invention, data indicating the reproduction order of PGs, stored in the DVD 101 is used. The data indicating the reproduction order of PGs will be described below.

PGC_PGMAP is information in the program chain (PGC) included in the DVD 101. As shown in FIG. 6, the PGC is formed of the program-chain information (PGCI) and a plurality of video objects (VOBs).

Figure 10:
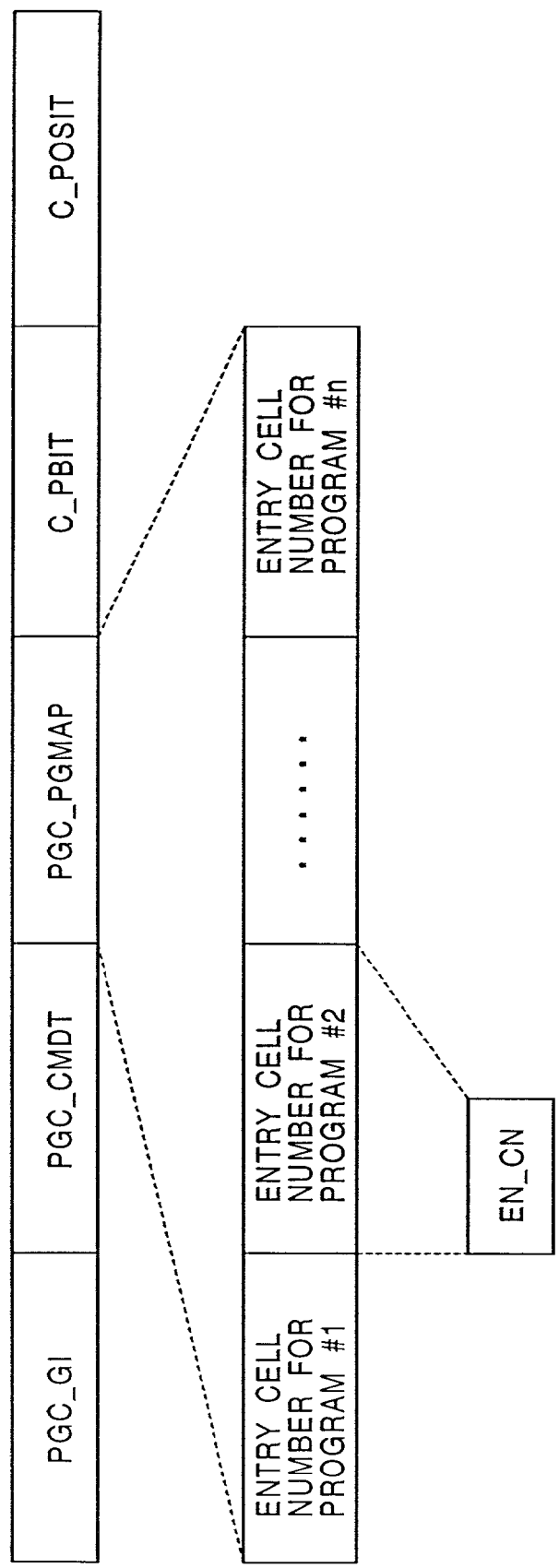
FIG. 10 illustrates the data structure of PGC_PGMAP.

PGC_PGMAP is a map indicating programs in the PGC. As shown in FIG. 10, entry cell numbers (EN_CNs) indicating the start cell numbers of the programs are described in an ascending order, and an EN_CN describes the start cell number of each program.

(c) Operation Flowchart in the Third Embodiment of the Present Invention

Figure 11:
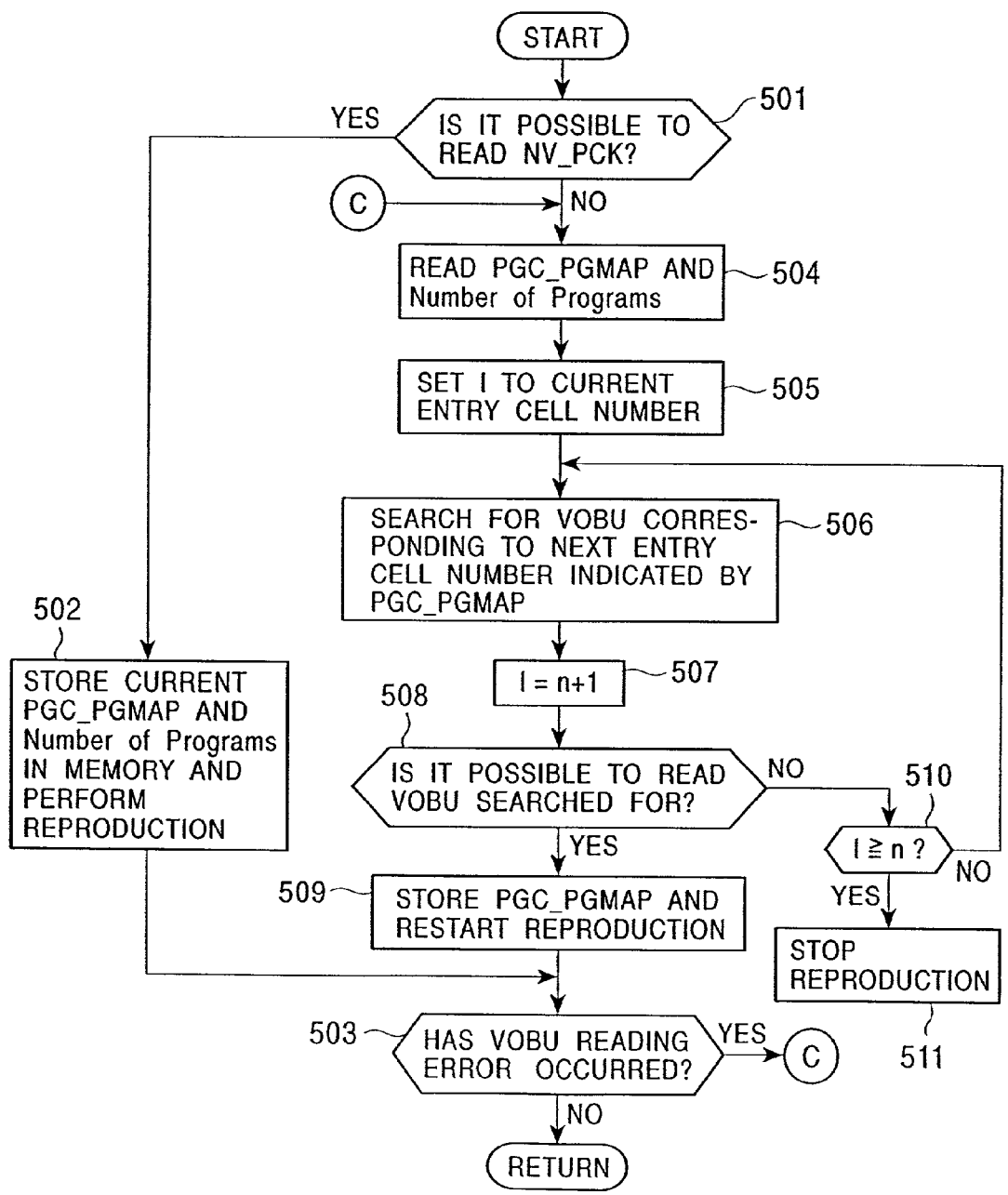
FIG. 11 is a flowchart of operations in a third embodiment of the present invention.

FIG. 11 is a flowchart of operations in the third embodiment of the present invention. The frame-start-position-information reading section 111a determines whether it is possible to read NV_PCK from the DVD 101, by checking, for example, whether the pickup 103 cannot be locked, or whether the type of read data is correct (in step 501). When reading NV_PCK is possible, the information of the current PGC_PGMAP and Number of Programs in the PGC_GI is stored in the memory 111*b*, and reproduction is continued according to a reproduction order included in the stored information (in step 502). Then, the frame-start-position-information reading section 111*a* determines whether a VOBU reading error has occurred during reproduction, by checking, for example, whether the pickup 103 cannot be locked, or whether the type of read data is correct (in step 503). When no error has occurred, the next VOBU is to be reproduced and the process of step 501 is performed. When reading NV_PCK is impossible in step 501, the PGC_PGMAP and Number of Programs in the PGC_GI, stored in the memory 111*b* are read (in step 504). The navigation manager 111 sets "1" to the current entry cell number in the memory 111*b* (in step 505).

Then, the search control section 117*a* searches for the VOBU corresponding to the entry cell number indicated by PGC_PGMAP (in step 506). The navigation manager 111 increments "1" by 1 in the memory 111*b* (in step 507). The frame-start-position-information reading section 111*a* determines whether the VOBU searched for in step 506 can be read (in step 508).

When the VOBU can be read, the navigation manager 111 instructs the search restart section 117*b* to search for the VOBU searched for in step 508, stores the current entry cell number in the memory 111*b*, and restarts reproduction (in step 509).

Back to step 508, when the VOBU searched for cannot be read, the navigation manager 111 determines whether "1" in the memory 111*b* is equal to or larger than the number (n) of programs described in Number of Programs (in step 510). When "1" is smaller than "n," the processing returns to step 506 and the following processes are executed. When "1" is equal to or larger than "n," the frame-start-position-information reading section 111*b* instructs the search control section 117*a* to stop searching to stop reproduction (in step 511).

(D) Fourth Embodiment of the Present Invention (a) Structure of a Recording-medium Reproduction Apparatus According to a Fourth Embodiment of the Present Invention.

The structure of a recording-medium reproduction apparatus according to a fourth embodiment of the present invention is the same as that shown in FIG. 1.

(b) Next_PGCN

In the fourth embodiment of the present invention, Next_PGCN stored in the DVD 101 is used. Next_PGCN is information in the program chain (PGC) included in the DVD 101.

Figure 12:
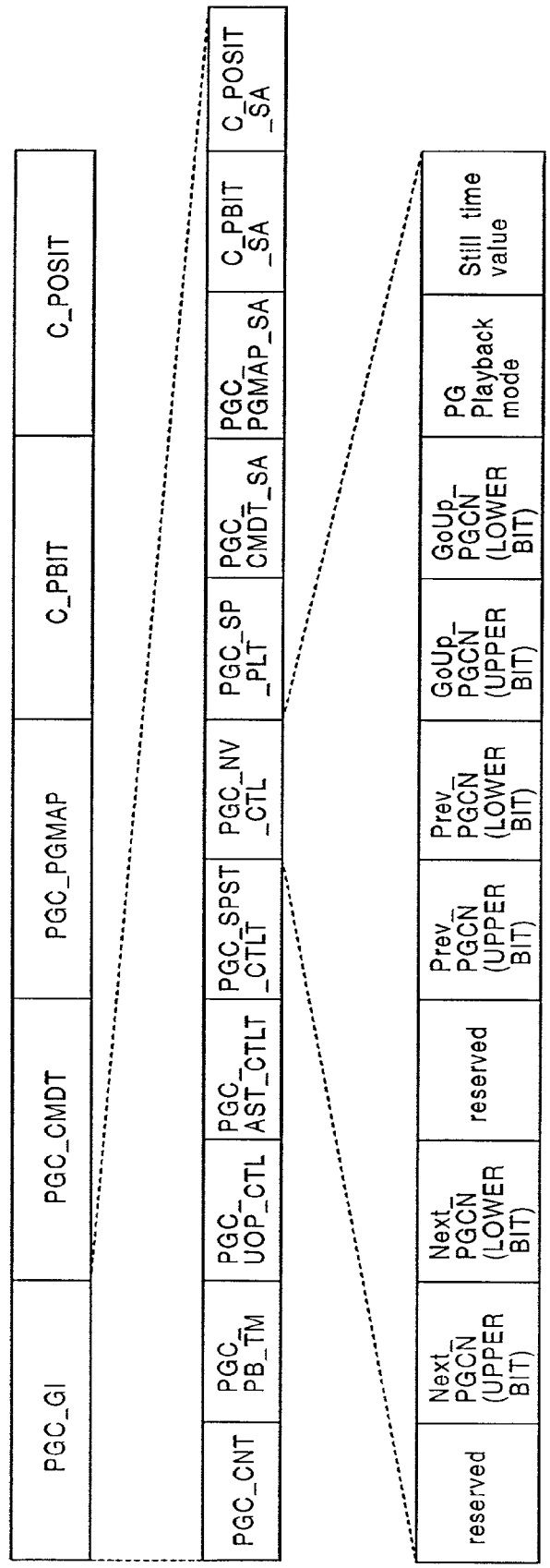
FIG. 12 illustrates the data structure of PGC_NV_CTL.

As shown in FIG. 12, PGC_NV_CTL is formed of Next_PGCN to be reproduced after the PGC currently being reproduced; Prev_PGCN which indicates the PGCN immediately before the PGC currently being reproduced; GoUp_PGCN which indicates the PGCN to which the process is to be returned from the PGC currently being reproduced; a PG Playback mode describing the PG reproduction mode of the PGC; a Still time value describing a still time obtained after the PGC currently being reproduced is reproduced; and reserved areas used for future function extension.

Figure 13:
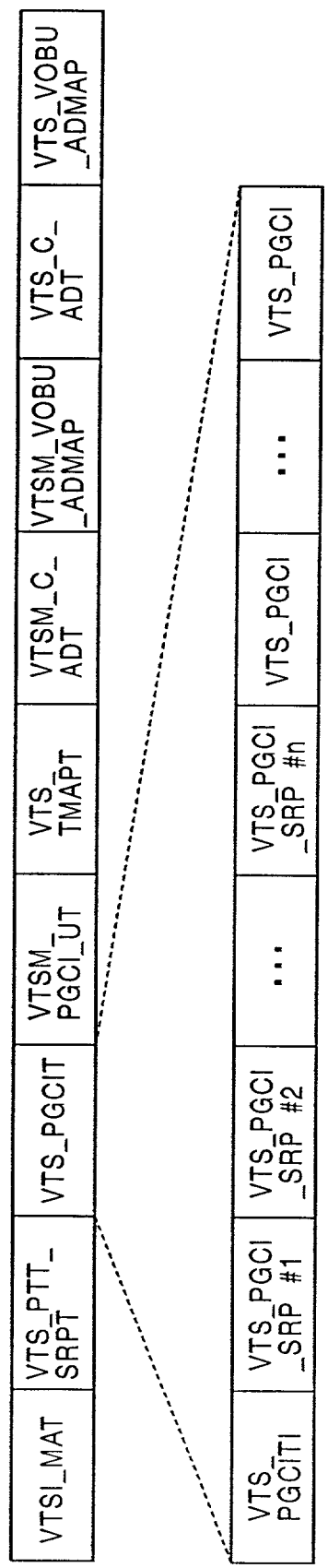
FIG. 13 illustrates the data structure of VTSI.

PGCN has the same number as VTS_PGCI included in VTS_PGCIT in VTSI (FIG. 2). As shown in FIG. 13, the VTSI is formed of video-title-set information (VTSI_MAT); a video-title-set PTT search-pointer table (VTS_PTT_SRPT); a video-title-set program-chain-information table (VTS_PGCIT); a video-title-set-menu PGCI unit table (VTSM_PGCI_UT); a video-title-set time-map table (VTS_TMAPT); a video-title-set cell-address table (VTSM_C_ADT); a video-title-set-menu video-object-unit-address map (VTSM_VOBU_ADMAP); a video-title-set cell-address table (VTS_C_ADT); and a video-title-set video-object-unit-address map (VTS_VOBU_ADMAP).

VTS_PGCIT is formed of video-title-set PGCI-table information (VTS_PGCITI), VTS_PGCI search pointers (VTS_PGCI_SRP#n), and VTS_PGCIs.

(c) Operation Flowchart in the Fourth Embodiment of the Present Invention

Figure 14:
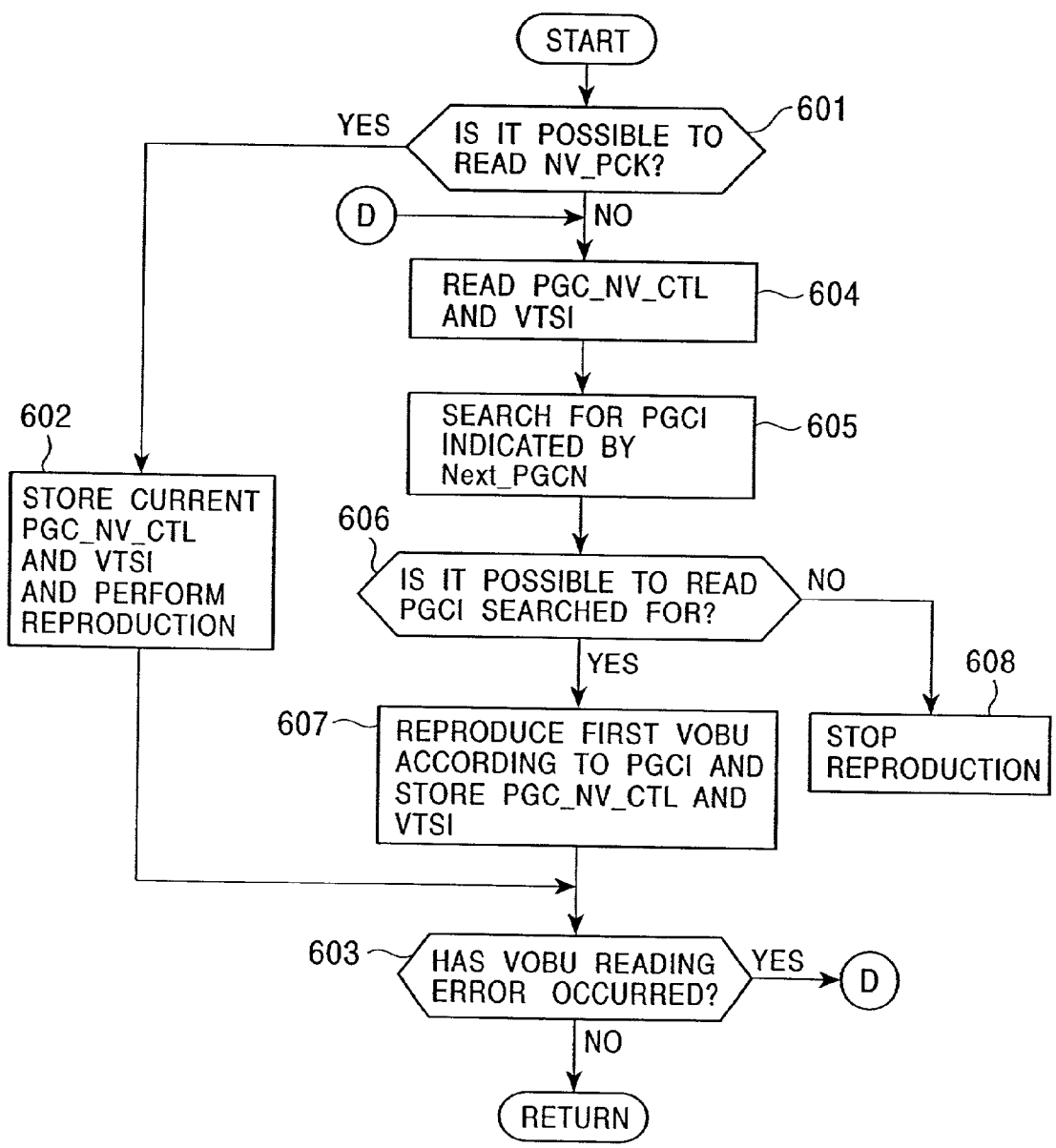
FIG. 14 is a flowchart of operations in a fourth embodiment of the present invention.

FIG. 14 is a flowchart of operations in the fourth embodiment of the present invention. The frame-start-position-information reading section 111*a* determines whether it is possible to read NV_PCK from the DVD 101, by checking, for example, whether the pickup 103 cannot be locked, or whether the type of read data is correct (in step 601). When reading NV_PCK is possible, the information of the current PGC_NV_CTL and VTSI is stored in the memory 111*b*, and reproduction is continued according to a reproduction order included in the stored information (in step 602). Then, the frame-start-position-information reading section 111*a* determines whether a VOBU reading error has occurred during reproduction, by checking, for example, whether the pickup 103 cannot be locked, or whether the type of read data is correct (in step 603). When no error has occurred, the next VOBU is to be reproduced and the process of step 601 is performed. When reading NV_PCK is impossible in step 601, the PGC_NV_CTL and VTSI stored in the memory 111*b* are read (in step 604).

Then, the search control section 117*a* searches for the PGCI indicated by Next_PGCN (in step 605). The frame-start-position-information reading section 111*a* determines whether the PGCI searched for can be read (in step 606).

When the PGCI can be read, the navigation manager 111 instructs the search restart section 117*b* to search for the PGCI searched for in step 605, stores PGC_NV_CTL and VTSI in the memory 111*b*, and restarts reproducing the VOBU according to the PGCI (in step 607).

Back to step 606, when the PGCI searched for cannot be read, the frame-start-position-information reading section 111*b* sends to the search control section 117*a* an instruction to stop searching to stop reproduction (in step 608).

(E) Fifth Embodiment of the Present Invention

The structure of a recording-medium reproduction apparatus according to a fifth embodiment of the present invention is the same as that shown in FIG. 1. Operations are performed according to the flowcharts shown in FIG. 5 and FIG. 9 with the processes of step 401 and the subsequent steps shown in FIG. 9 following the process of step 211 shown in FIG. 5.

(F) Sixth Embodiment of the Present Invention

The structure of a recording-medium reproduction apparatus according to a sixth embodiment of the present invention is the same as that shown in FIG. 1. Operations are performed according to the flowcharts shown in FIG. 9 and FIG. 11 with the processes of step 501 and the subsequent steps shown in FIG. 11 following the process of step 411 shown in FIG. 9.

(G) Seventh Embodiment of the Present Invention

The structure of a recording-medium reproduction apparatus according to a seventh embodiment of the present invention is the same as that shown in FIG. 1. Operations are performed according to the flowcharts shown in FIG. 11 and FIG. 14 with the processes of step 601 and the subsequent steps shown in FIG. 14 following the process of step 511 shown in FIG. 11.

(H) Eighth Embodiment of the Present Invention

The structure of a recording-medium reproduction apparatus according to an eighth embodiment of the present invention is the same as that shown in FIG. 1. Operations are performed according to the flowcharts shown in FIG. 5, FIG. 9, and FIG. 11 with the processes of step 401 and the subsequent steps shown in FIG. 9 following the process of step 211 shown in FIG. 5, and the processes of step 501 and the subsequent steps shown in FIG. 11 following the process of step 411 shown in FIG. 9.

(I) Ninth Embodiment of the Present Invention

The structure of a recording-medium reproduction apparatus according to a ninth embodiment of the present invention is the same as that shown in FIG. 1. Operations are performed according to the flowcharts shown in FIG. 9, FIG. 11, and FIG. 14 with the processes of step 501 and the subsequent steps shown in FIG. 11 following the process of step 411 shown in FIG. 9, and the processes of step 601 and the subsequent steps shown in FIG. 14 following the process of step 511 shown in FIG. 11.

(J) Tenth Embodiment of the Present Invention

The structure of a recording-medium reproduction apparatus according to a tenth embodiment of the present invention is the same as that shown in FIG. 1. Operations are performed according to the flowcharts shown in FIG. 5, FIG. 9, FIG. 11, and FIG. 14 with the processes of step 401 and the subsequent steps shown in FIG. 9 following the process of step 211 shown in FIG. 5; the processes of step 501 and the subsequent steps shown in FIG. 11 following the process of step 411 shown in FIG. 9; and the processes of step 601 and the subsequent steps shown in FIG. 14 following the process of step 511 shown in FIG. 11.

Figure 15:
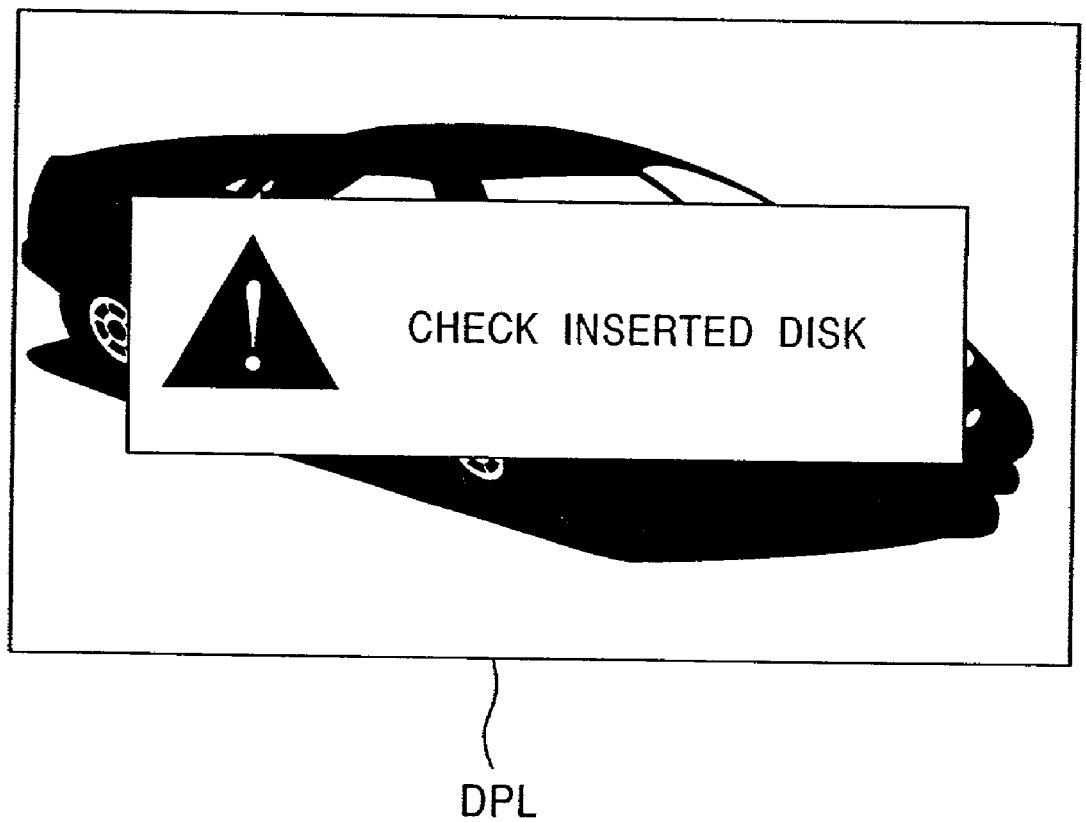
FIG. 15 illustrates an example of a disk-problem indication.

In the above embodiments, if it is impossible to restart reproduction, a disk problem may be indicated to the user on a display unit as shown in FIG. 15.

DVD video reproduction apparatuses are used in the above embodiments. However, a DVD audio reproduction apparatus may be used.

The invention claimed is:

1. A recording-medium reproduction method for reading, by a pickup, reproduction data stored in a recording medium in units of frames and for reproducing it, comprising:
   reading start-position information of a next frame to be read according to a reproduction order and that of a predetermined frame other than the next frame;
   storing the read start-position information of the frames;
   controlling the pickup according to the read start-position information of the next frame;
   determining whether the next frame can be read;
   if the next frame can be read, reproducing the reproduction data of the next frame; and
   if the next frame cannot be read, reading a frame other than the next frame according to the stored start-position information of the predetermined frame and reproducing the reproduction data of a frame which can be read;
   wherein the start-position information of the predetermined frame is data indicating the reproduction order of cells in a digital video disk.

2. A recording-medium reproduction method for reading, by a pickup, reproduction data stored in a recording medium in units of frames and for reproducing it, comprising:
   reading start-position information of a next frame to be read according to a reproduction order and that of a predetermined frame other than the next frame;
   storing the read start-position information of the frames;
   controlling the pickup according to the read start-position information of the next frame;
   determining whether the next frame can be read;
   if the next frame can be read, reproducing the reproduction data of the next frame; and
   if the next frame cannot be read, reading a frame other than the next frame according to the stored start-position information of the predetermined frame and reproducing the reproduction data of a frame which can be read;
   wherein the start-position information of the predetermined frame is data indicating the reproduction order of PGs in a digital video disk.

3. A recording-medium reproduction method for reading, by a pickup, reproduction data stored in a recording medium in units of frames and for reproducing it, comprising:
   reading start-position information of a next frame to be read according to a reproduction order and that of a predetermined frame other than the next frame;
   storing the read start-position information of the frames;
   controlling the pickup according to the read start-position information of the next frame;
   determining whether the next frame can be read;
   if the next frame can be read, reproducing the reproduction data of the next frame; and
   if the next frame cannot be read, reading a frame other than the next frame according to the stored start-position information of the predetermined frame and reproducing the reproduction data of a frame which can be read;
   wherein the start-position information of the predetermined frame is Next_PGCN in a digital video disk.

4. A recording-medium reproduction method for reading, by a pickup, reproduction data stored in a recording medium in units of frames and for reproducing it, comprising:
   reading start-position information of a next frame to be read according to a reproduction order and that of a plurality of types of predetermined frames other than the next frame;
   storing the read start-position information of the next frame and that of the plurality of types of predetermined frames other than the next frame;
   controlling the pickup according to the read start-position information of the next frame;
   determining whether the next frame can be read;
   if the next frame can be read, reproducing the reproduction data of the next frame; and
   if the next frame cannot be read, reading a frame other than the next frame according to the stored start-position information of the plurality of types of predetermined frames and reproducing the reproduction data of a frame which can be read.

5. A recording-medium reproduction method according to claim 4, wherein the start-position information of the plurality of types of predetermined frames is data indicating the reproduction order of VOBUs and data indicating the reproduction order of cells in a digital video disk; if the next frame cannot be read, a frame other than the next frame is read according to the stored data indicating the reproduction order of VOBUs; and if even that frame cannot be read, a frame other than the next frame is read according to the stored data indicating the reproduction order of cells.

6. A recording-medium reproduction method according to claim 4, wherein the start-position information of the plurality of types of predetermined frames is data indicating the reproduction order of cells and data indicating the reproduction order of PGs in a digital video disk; if the next frame cannot be read, a frame other than the next frame is read according to the stored data indicating the reproduction order of cells; and if even that frame cannot be read, a frame other than the next frame is read according to the stored data indicating the reproduction order of PGs.

7. A recording-medium reproduction method according to claim 4, wherein the start-position information of the plurality of types of predetermined frames is data indicating the reproduction order of PGs and Next_PGCN in a digital video disk; if the next frame cannot be read, a frame other than the next frame is read according to the stored data indicating the reproduction order of PGs; and if even that frame cannot be read, a frame other than the next frame is read according to Next_PGCN.

8. A recording-medium reproduction method according to claim 4, wherein the start-position information of the plurality of types of predetermined frames is data indicating the reproduction order of VOBUs, data indicating the reproduction order of cells, and data indicating the reproduction order of PGs in a digital video disk; if the next frame cannot be read, a frame other than the next frame is read according to the stored data indicating the reproduction order of VOBUs; if even that frame cannot be read, a frame other than the next frame is read according to the stored data indicating the reproduction order of cells; and further if even that frame cannot be read, a frame other than the next frame is read according to the stored data indicating the reproduction order of PGs.

9. A recording-medium reproduction method according to claim 4, wherein the start-position information of the plurality of types of predetermined frames is data indicating the reproduction order of cells, data indicating the reproduction order of PGs, and Next_PGCN in a digital video disk; if the next frame cannot be read, a frame other than the next frame is read according to the stored data indicating the reproduction order of cells; if even that frame cannot be read, a frame other than the next frame is read according to the stored data indicating the reproduction order of PGs; and further if even that frame cannot be read, a frame other than the next frame is read according to the stored Next_PGCN.

10. A recording-medium reproduction method according to claim 4, wherein the start-position information of the plurality of types of predetermined frames is data indicating the reproduction order of VOBUs, data indicating the reproduction order of cells, data indicating the reproduction order of PGs, and Next_PGCN in a digital video disk; if the next frame cannot be read, a frame other than the next frame is read according to the stored data indicating the reproduction order of VOBUs; if even that frame cannot be read, a frame other than the next frame is read according to the stored data indicating the reproduction order of cells; further if even that frame cannot be read, a frame other than the next frame is read according to the stored data indicating the reproduction order of PGs; and furthermore if even that frame cannot be read, a frame other than the next frame is read according to the stored Next_PGCN.

11. A recording-medium reproduction apparatus for reading, by a pickup, reproduction data stored in a recording medium in units of frames and for reproducing it, comprising:
frame-start-position-information reading means for reading start-position information of a next frame to be read according to a reproduction order and that of a predetermined frame other than the next frame;
a memory for storing the information read by the frame-start-position-information reading means; and
reproduction control means for controlling the pickup according to the start-position information of the next frame, read by the frame-start-position-information reading means, for determining whether the next frame can be read, for reproducing the reproduction data of the next frame if the next frame can be read, and for reading a frame other than the next frame according to the start-position information of the predetermined frame stored in the memory, and reproducing the reproduction data of a frame which can be read if the next frame cannot be read;
wherein, as the start-position information of the predetermined frame, data indicating the reproduction order of cells in a digital video disk is used.

12. A recording-medium reproduction apparatus for reading, by a pickup, reproduction data stored in a recording medium in units of frames and for reproducing it, comprising:
frame-start-position-information reading means for reading start-position information of a next frame to be read according to a reproduction order and that of a predetermined frame other than the next frame;
a memory for storing the information read by the frame-start-position-information reading means; and
reproduction control means for controlling the pickup according to the start-position information of the next frame, read by the frame-start-position-information reading means, for determining whether the next frame can be read, for reproducing the reproduction data of the next frame if the next frame can be read, and for reading a frame other than the next frame according to the start-position information of the predetermined frame stored in the memory, and reproducing the reproduction data of a frame which can be read if the next frame cannot be read;
wherein, as the start-position information of the predetermined frame, data indicating the reproduction order of PGs in a digital video disk is used.

13. A recording-medium reproduction apparatus for reading, by a pickup, reproduction data stored in a recording medium in units of frames and for reproducing it, comprising:
frame-start-position-information reading means for reading start-position information of a next frame to be read according to a reproduction order and that of a predetermined frame other than the next frame;
a memory for storing the information read by the frame-start-position-information reading means; and
reproduction control means for controlling the pickup according to the start-position information of the next frame, read by the frame-start-position-information reading means, for determining whether the next frame can be read, for reproducing the reproduction data of the next frame if the next frame can be read, and for reading a frame other than the next frame according to the start-position information of the predetermined frame stored in the memory, and reproducing the reproduction data of a frame which can be read if the next frame cannot be read; wherein, as the start-position information of the predetermined frame, Next_PGCN in a digital video disk is used.

14. A recording-medium reproduction apparatus for reading, by a pickup, reproduction data stored in a recording medium in units of frames and for reproducing it, comprising:

frame-start-position-information reading means for reading start-position information of a next frame to be read according to a reproduction order and that of a plurality of types of predetermined frames other than the next frame;

a memory for storing the information read by the frame-start-position-information reading means; and reproduction control means for controlling the pickup according to the start-position information of the next frame, read by the frame-start-position-information reading means, for determining whether the next frame can be read, for reproducing the reproduction data of the next frame if the next frame can be read, and for reading a frame other than the next frame according to the start-position information of the plurality of types of predetermined frames, stored in the memory, and reproducing the reproduction data of a frame which can be read if the next frame cannot be read.

15. A recording-medium reproduction apparatus for reading, by a pickup, reproduction data stored in a recording medium in units of frames and for reproducing it, comprising:

a frame-start-position-information reading section for reading start-position information of a next frame to be read according to a reproduction order and that of a plurality of types of predetermined frames other than the next frame;

a memory for storing the information read by the frame-start-position-information reading section; and a reproduction control section for controlling the pickup according to the start-position information of the next frame, read by the frame-start-position-information reading section, for determining whether the next frame can be read, for reproducing the reproduction data of the next frame if the next frame can be read, and for reading a frame other than the next frame according to the start-position information of the plurality of types of predetermined frames, stored in the memory, and reproducing the reproduction data of a frame which can be read if the next frame cannot be read.

* * * * *